US 11,695,329 B2

(12) United States Patent
Pevere

(10) Patent No.: US 11,695,329 B2
(45) Date of Patent: Jul. 4, 2023

(54) SWITCHED MODE POWER SUPPLY WITH POWER FACTOR CONTROL

(71) Applicant: Infineon Technologies Austria AG, Villach (AT)

(72) Inventor: Alessandro Pevere, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/539,787

(22) Filed: Dec. 1, 2021

(65) Prior Publication Data
US 2022/0181966 A1  Jun. 9, 2022

(30) Foreign Application Priority Data
Dec. 9, 2020 (EP) .................................. 20212888

(51) Int. Cl.
*H02M 1/42* (2007.01)
*H02M 1/00* (2006.01)
*H02M 7/219* (2006.01)

(52) U.S. Cl.
CPC ......... *H02M 1/4225* (2013.01); *H02M 1/007* (2021.05); *H02M 1/0085* (2021.05); *H02M 1/4233* (2013.01); *H02M 7/219* (2013.01)

(58) Field of Classification Search
CPC .. H02M 1/007; H02M 1/0085; H02M 1/4225; H02M 1/4233; H02M 7/219
See application file for complete search history.

(56) References Cited

U.S. PATENT DOCUMENTS

| 9,252,654 B1* | 2/2016 | Tomioka ............. H02M 1/4225 |
| 9,590,495 B2* | 3/2017 | Fu ....................... H02M 1/0085 |
| 10,498,225 B2* | 12/2019 | Li ....................... H02M 1/4241 |
| 2011/0134671 A1 | 6/2011 | Balocco |
| 2013/0049709 A1 | 2/2013 | Fu et al. |
| 2018/0342893 A1 | 11/2018 | Yamada et al. |

(Continued)

OTHER PUBLICATIONS

"Power Factor Correction (PFC) Handbook, Choosing the Right Power Factor Controller Solution", ON Semiconductor, Energy Efficient Innovation, Rev. 5, Apr. 2014, pp. 3-127.

(Continued)

*Primary Examiner* — Jue Zhang
(74) *Attorney, Agent, or Firm* — Murphy, Bilak & Homiller, PLLC

(57) ABSTRACT

A circuit for use in a switched mode power supply includes a dual-boost power-factor correction converter having an active rectifier stage with first and second rectifier transistors and first and second boost stages each with an inductor and transistor. An active rectifier controller circuit generates control signals for driving the rectifier transistors, respectively, on and off in accordance with an AC input voltage. A PFC controller circuit generates a pulse-width-modulated (PWM) control signal that is based on an output voltage of the boost stages and which is further based on a current sense signal representing the current passing through the active rectifier stage. A logic circuit generates a control signal for the transistor of the first boost stage and a control signal for the transistor of the second boost stage, based on the PWM control signal and at least one of the control signals for the rectifier transistors.

10 Claims, 6 Drawing Sheets

(56) References Cited

U.S. PATENT DOCUMENTS

2019/0131864 A1* 5/2019 Ikarashi .................. H02M 1/12

OTHER PUBLICATIONS

"8-Pin Continuous Conduction Mode (CCM) PFC Controller", Texas Instruments Incorporated, Apr. 2007—Revised Dec. 2007.
Qi, Tao, et al., "Dual-Boost Single-Phase PFC Input Current Control Based on Output Current Sensing", IEEE Transactions on Power Electronics, vol. 24, No. 11, Nov. 2009, pp. 2523-2530.

* cited by examiner

SWITCHED MODE POWER SUPPLY WITH POWER FACTOR CONTROL

TECHNICAL FIELD

The present disclosure relates to the field of switching converters, in particular to a switched-mode power supply (SMPS) with power factor correction (PFC) and suitable control circuitry.

BACKGROUND

AC/DC converters with PFC are commonly used in switched-mode power supplies. PFC entails controlling the input current to be in phase with the alternating grid voltage and with a phase offset as small as possible. Minimizing the phase offset means minimizing the reactive power the power grid is loaded with. Several suitable circuit topologies are known as such, one of which is referred to as (bridgeless) dual-boost PFC converter. However, in many applications a standard boost PFC converter is used as controlling such standard circuitry is less complex.

One example of a standard boost PFC converter is discussed in the data sheet Texas Instruments "8-Pin Continuous Conduction Mode (CCM) PFC Controller" UCC28019, April 2007. In order to be able to minimize the phase difference between input current and input voltage, a current sensing circuit is needed which is usually implemented using a single current sense resistor. The above-mentioned dual-boost PFC converter topology has some advantages (e.g. lower conduction losses and lower cooling requirements) over the standard boost PFC converter topology. However, in a dual-boost PFC converter topology the load current splits into at least two separate circuit branches, which makes sensing a precise current more difficult. As a consequence, standard controllers for standard boost PFC converters cannot be used to control dual-boost PFC converters.

The inventors have identified a need for further improvement of the control of dual-boost PFC converters.

SUMMARY

A circuit for use in a switched mode power supply is described herein. In accordance with one embodiment the circuit includes a dual-boost power-factor correction (PFC) converter having an active rectifier stage with a first and a second rectifier transistor, a first boost stage with a first inductor and a first transistor, and a second boost stage with a second inductor and a second transistor. The circuit further includes an active rectifier controller circuit configured to generate a first and a second control signal for driving the first and, respectively, the second rectifier transistor on and off in accordance with an AC input voltage. Further, the circuit includes a PFC controller circuit configured to generate a pulse-width-modulated (PWM) control signal that is based on an output voltage of the first and the second boost stage and which is further based on a current sense signal representing the current passing through the active rectifier stage. A logic circuit is configured to generate a third control signal for the first transistor of the first boost stage and a fourth control signal for the second transistor of the second boost stage based on the PWM control signal and at least one of the first and the second control signals.

A further embodiment relates to a method which may be used to operate a dual-boost PFC converter having an active rectifier stage with a first and a second rectifier transistor, a first boost stage with a first inductor and a first transistor, and a second boost stage with a second inductor and a second transistor. The method includes generating a first and a second control signal for driving the first and, respectively, the second rectifier transistor on and off in accordance with an AC input voltage; sensing a current passing through the active rectifier stage and providing a respective current sense signal; generating a PWM control signal based on an output voltage of the first and the second boost stage and further based on the current sense signal; and generating a third control signal for the first transistor of the first boost stage as well as a fourth control signal for the second transistor of the second boost stage based on the PWM control signal and at least one of the first and the second control signals.

BRIEF DESCRIPTION OF THE DRAWINGS

The invention can be understood better with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
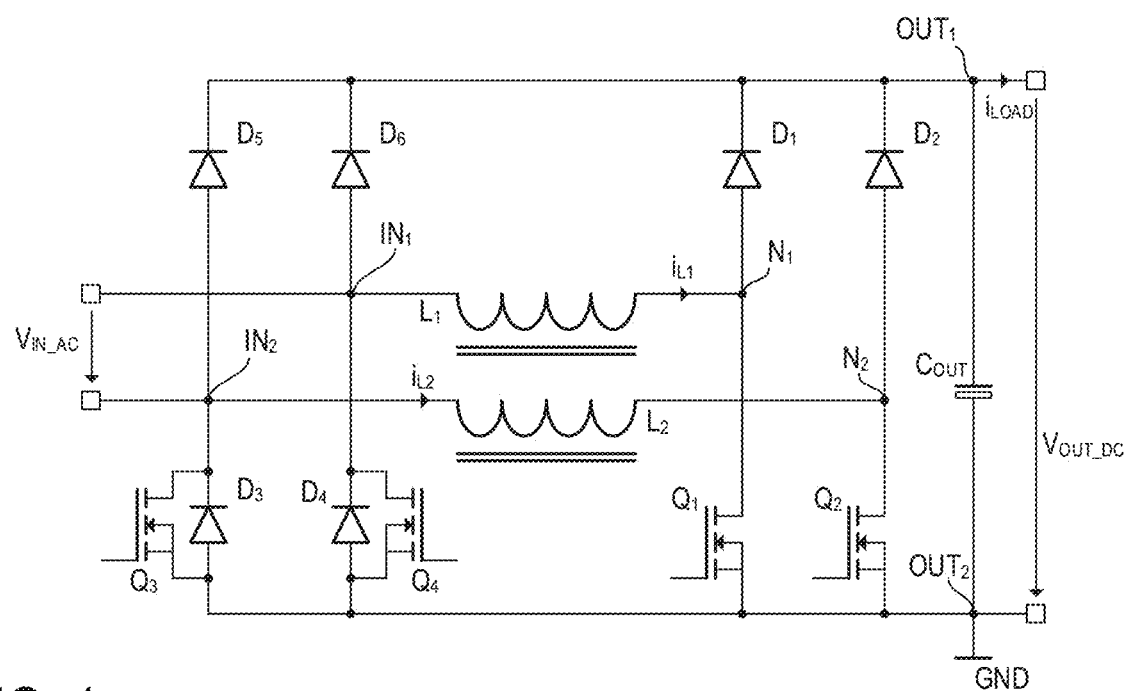
FIG. 1 illustrates one example of a dual-boost PFC convert topology.

FIG. 1 illustrates one example of a dual-boost PFC convert topology. The circuit of FIG. 1 includes two input nodes $IN_1$ and $IN_2$, at which the alternating input voltage $V_{IN\_AC}$ is applied (e.g. the 230V/50 Hz grid voltage), and two output nodes $OUT_1$ and $OUT_2$, at which the DC output voltage $V_{OUT\_DC}$ is provided. The output node $OUT_2$ may be connected to a ground node GND, the electric potential of which may be defined as ground potential $V_{GND}$ (e.g. 0V). Diodes $D_5$ and $D_6$ are free-wheeling diodes and are connected between input node $IN_2$ and output node $OUT_1$ and, respectively, input node $IN_1$ and output node $OUT_1$, wherein the anodes of the diodes $D_5$ and $D_6$ are connected to the input nodes $IN_2$ and $IN_1$, respectively. Similarly, diodes $D_3$ and $D_4$ are connected between input node $IN_2$ and output node $OUT_2$ and, respectively, input node $IN_1$ and output node $OUT_2$, wherein the cathodes of the diodes $D_3$ and $D_4$ are connected to the input nodes $IN_2$ and $IN_1$, respectively.

MOSFETs $Q_3$ and $Q_4$ may be connected in parallel to diodes $D_3$ and $D_4$, respectively. The MOSFETs $Q_3$ and $Q_4$ form an active rectifier stage.

A first inductor $L_1$ is connected between the input node $IN_1$ and circuit node $N_1$, and a second inductor $L_2$ is connected between the input node $IN_2$ and circuit node $N_2$. Diodes $D_1$ and $D_2$ are connected between circuit node $N_1$ and output node $OUT_1$ and, respectively, circuit node $N_2$ and output node $OUT_1$, wherein the anodes of diodes $D_1$ and $D_2$ are connected to circuit nodes $N_1$ and $N_2$, respectively. MOSFETs $Q_1$ and $Q_2$ are connected between circuit node $N_1$ and output node $OUT_2$ and, respectively, circuit node $N_2$ and output node $OUT_2$. An output capacitor $C_{OUT}$ is connected between the output nodes $OUT_1$ and $OUT_2$. It is noted that other types of transistors may be used instead of MOSFETs in other embodiments. The first inductor $L_1$ and the MOSFET $Q_1$ form a first boost stage, and the second inductor $L_2$ and the MOSFET $Q_2$ form a second boost stage. As will be discussed later, the first boost stage is active (PFC operation) during the positive semi-wave of the AC input voltage $V_{IN\_AC}$ and the second boost stage is active during the negative semi-wave of the AC input voltage (and inactive otherwise). The fact that the PFC converter has two boost stages is the reason for the name dual-boost PFC converter.

Figure 2:
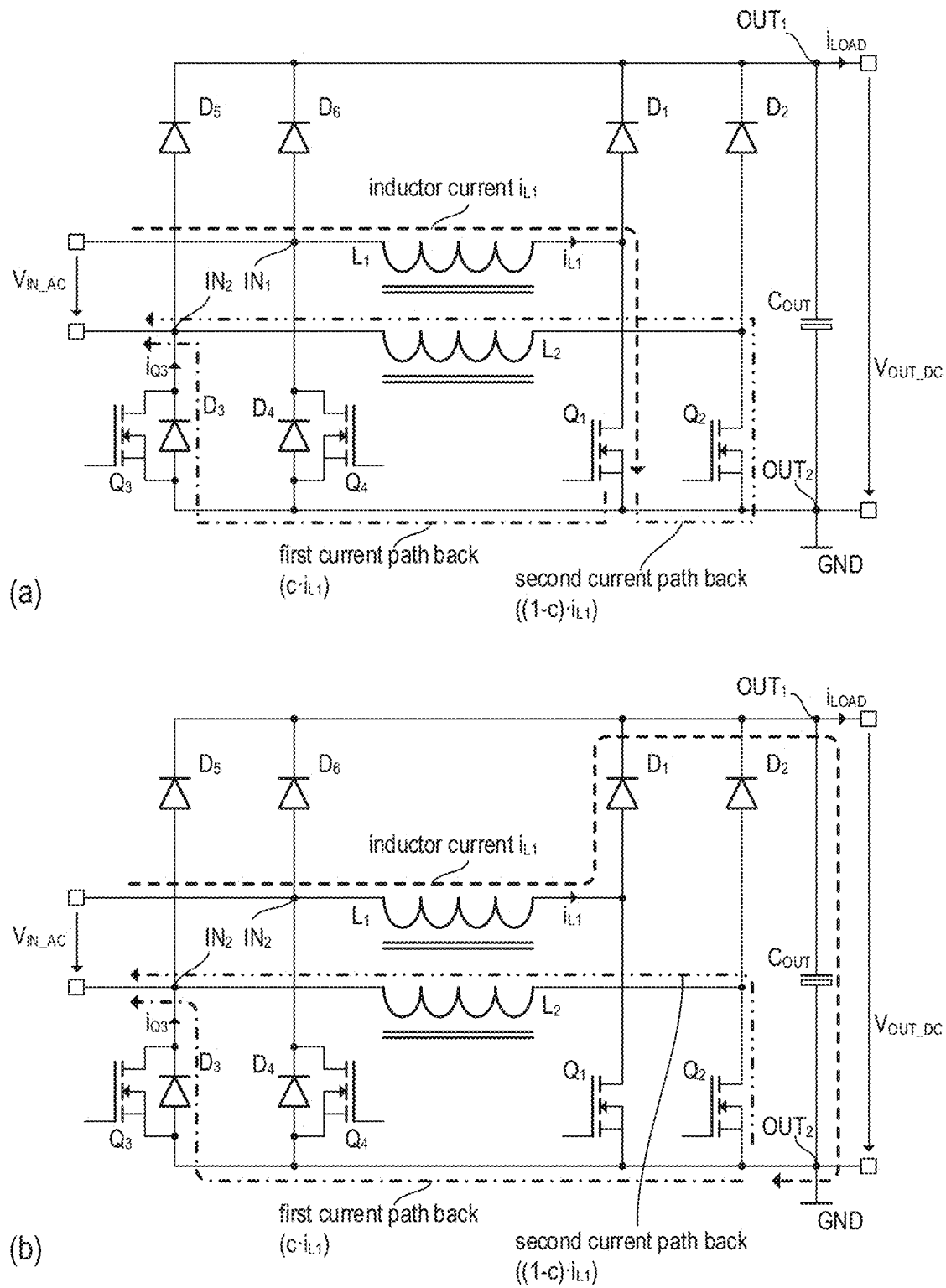
FIG. 2 illustrates the current flow through the circuit of FIG. 1 for different switching states of the circuit (diagrams (a) and (b)).

To allow a low complexity of the control circuit, which generates the drive signals (gate voltages) for the MOSFETs, the MOSFETs $Q_1$ and $Q_2$ are driven with the same pulse-width modulated (PWM) signal. In order to improve the efficiency of the circuit, an active rectification is accomplished using MOSFETs $Q_3$ and $Q_4$, which are connected in parallel to diodes $D_3$ and $D_4$. It is noted that, in some embodiments, the intrinsic body diodes of MOSFETs $Q_3$ and $Q_4$ may serve as diodes $D_3$ and $D_4$. In other embodiments, the diodes $D_3$, $D_4$, $D_5$, and $D_6$ may be formed by a full-bridge rectifier (in this case, the intrinsic body diodes of the MOSFETs $Q_3$ and $Q_4$ are redundant). When using the circuit topology shown in FIG. 1, the inductor currents $i_{L1}$ and $i_{L2}$ return via different current paths during the charging and discharging periods of the respective inductors $L_1$ and $L_2$. The diagrams of FIG. 2 illustrate the different current paths taken by the inductor current during the positive semi-cycle of the alternating input voltage $V_{IN\_AC}$. In case of a 50 Hz grid voltage, the duration of a semi-cycle is 10 ms (8.33 ms for 60 Hz).

In FIG. 2, diagram (a), illustrates the situation in which the MOSFET $Q_1$ is switched on (inductor $L_1$ is charged, energy stored in inductor $L_1$ increases), whereas diagram (b), illustrates the situation in which the MOSFET $Q_1$ is switched off (inductor $L_1$ is discharged, energy stored in inductor $L_1$ decreases). Both diagrams (a) and (b) relate to a situation, in which the alternating input voltage $V_{IN\_AC}$ is positive.

Once the MOSFET $Q_1$ is switched on, the inductor current $i_{L1}$ passes from the input node $IN_1$ through the inductor $L_1$ and the MOS channel of MOSFET $Q_1$ (see FIG. 2, diagram (a), dashed line). After MOSFET $Q_1$, the circuit can be closed via two different current paths (return paths). A first part $c \cdot i_{L1}$ of the inductor current takes its way through diode $D_3$, and a second part $(1-c) \cdot i_{L1}$ of the inductor current takes its way through MOSFET $Q_2$ and inductor $L_2$ (MOSFET $Q_2$ is on during this phase). Here the variable c is a number between 0 and 1 and can be interpreted as the fraction of the inductor current that takes the first current path back to input node $IN_2$. Accordingly, 1-c can be interpreted as the fraction of the inductor current that takes the second current path back to input node $IN_2$. This situation is illustrated in diagram (a) of FIG. 2. The dash-dotted line illustrates the first current path and the dash-dot-dotted line the second current path back to input node $IN_2$.

Once the MOSFET $Q_1$ is switched off, the current path via MOSFET $Q_1$ is blocked and, therefore, the inductor current $i_{L1}$ passes from the input node $IN_1$ through the inductor $L_1$ and the output capacitor $C_{OUT}$ (see FIG. 2, diagram (b), dashed line) thereby charging the output capacitor $C_{OUT}$. After output capacitor $C_{OUT}$, the circuit can again be closed via two different current paths. A first part $c \cdot i_{L1}$ of the inductor current takes its way through diode $D_3$, and a second part $(1-c) \cdot i_{L1}$ of the inductor current takes its way through the intrinsic body diode of MOSFET $Q_2$ and inductor $L_2$ (MOSFET $Q_2$ is off during this phase). This situation is illustrated in diagram (b) of FIG. 2. The dash-dotted line illustrates the first current path and the dash-dot-dotted line the second current path back to input node $IN_2$. The actual value of the fractions c (and 1-c) depend on the actual electric impedances of the two return paths As mentioned, FIG. 2 relates to a situation in which the alternating input voltage $V_{IN\_AC}$ is positive (positive semi-cycle). The situation is analogous during the negative semi-cycle, i.e. while the alternating input voltage $V_{IN\_AC}$ is negative. In this case, the inductor current $i_{L2}$ passes from input node $IN_1$ through inductor $L_2$ and flows back to input node $IN_2$ via two different return paths.

Figure 3:
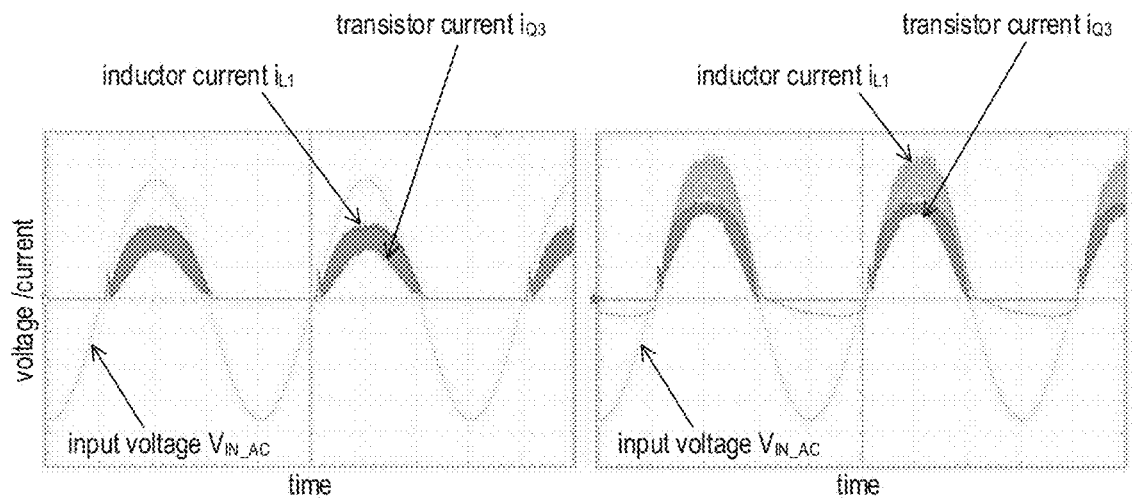
FIG. 3 includes diagrams showing exemplary signal waveforms of inductor current and rectifier current for 50% and 100% of nominal load current.

Experimental verification of the two separate return paths is illustrated in FIG. 3. The left diagram of FIG. 3 relates to a situation at 50 percent nominal load current $i_{LOAD}$, and it illustrates the inductor current $i_{L1}$ passing through inductor $L_1$ as well as the current $i_{Q3}$ passing through the MOSFET $Q_3$, which is used for rectification (cf. FIG. 2). In this situation (50% load), almost all of the inductor current flows back to the AC input voltage source via MOSFET $Q_3$ (i.e. the fraction $c \approx 1$ in FIG. 2, diagram (a)). Accordingly, the waveforms of the currents $i_{L1}$ and $i_{Q3}$ approximately match.

The right diagram of FIG. 3 relates to a situation at 100 percent nominal load current $i_{LOAD}$ and also illustrates the inductor current $i_{L1}$ passing through inductor $L_1$ as well as the current $i_{Q3}$ passing through the MOSFET $Q_3$. In this situation (100% load), most but not all of the inductor current flows back to the AC input voltage source via MOSFET $Q_3$ (i.e. the fraction $c<1$ in FIG. 2, diagram (a)). This means that a part (i.e. a fraction 1-c) of the current takes the second return path via MOSFET $Q_2$ and inductor $L_2$. One undesired effect of the current flowing back through the other leg of the converter (i.e. inductor $L_2$) is a negative, distorted sinusoidal-shaped inductor current $i_{L1}$ during the negative semi-cycle.

Common analog controllers for PFC converters need one current sense signal, wherein usually the rectified current is measured using a current sense resistor. Applying this concept to the dual-boost converter of FIG. 1 would mean that the current sense resistor must be inserted in the first current path past the MOSFET $Q_1$. In this situation, the transistor current $i_{Q3}$ passing through MOSFET $Q_3$ is measured in the positive semi cycle (and the current passing through MOSFET $Q_4$ in the negative semi-cycle). However, as discussed above with reference to FIG. 3, this approach would result in a current sense signal that does not fully reflect the total inductor current, but only the fraction $c \cdot i_{L1}$ of the current, wherein the actual value of c depends on the actual load current. When a simple analog controller is desired, which provides a single gate signal (for transistors $Q_3$ and $Q_4$), the standard approach that is commonly used for standard boost PFC converters cannot be applied to dual-boost PFC converter topologies.

Figure 4:
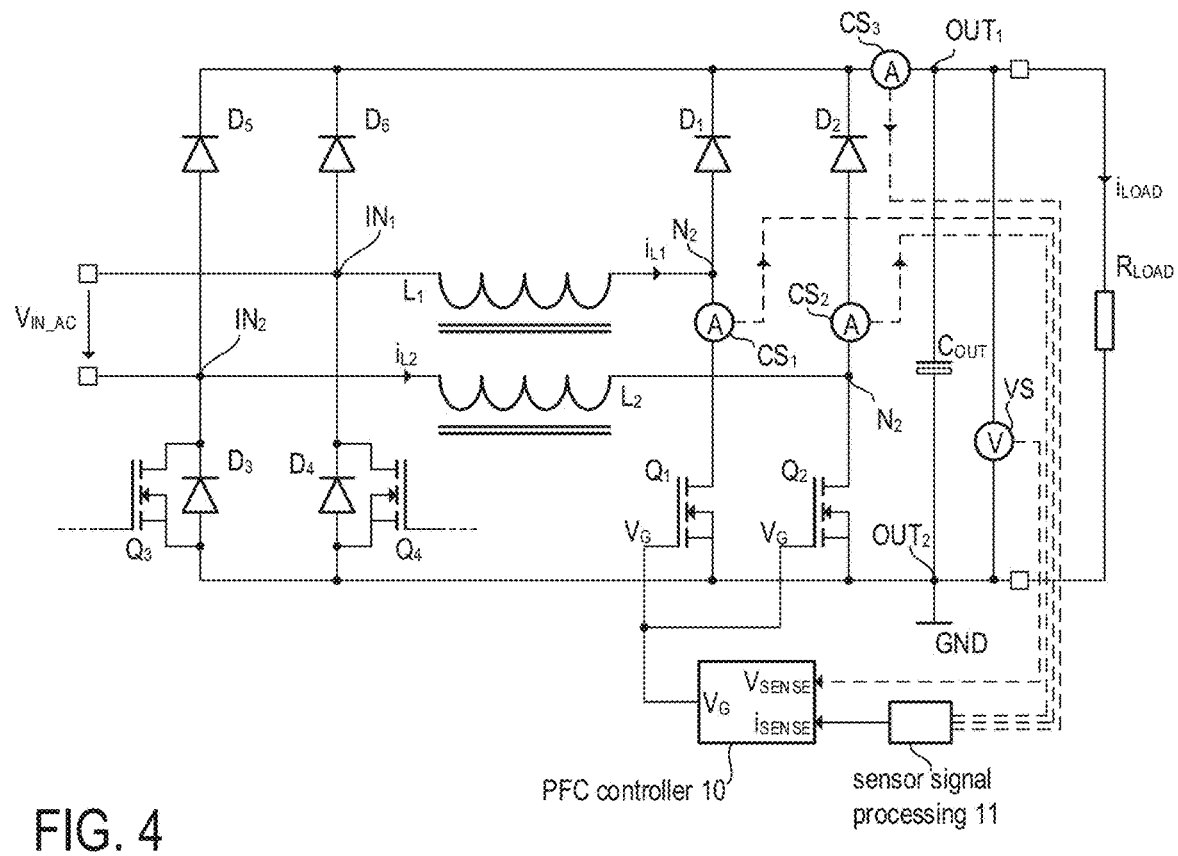
FIG. 4 illustrates one example of a dual-boost PFC converter with multiple current sensors.

Due to the fact that the inductor current is split into (at least) two current paths, a current sensor circuit is needed at three different positions of the circuit in order to be able to obtain the full current information. An example (based on FIG. 1) is illustrated in FIG. 4. In order to be able to use a standard PFC controller 10, three current sensors CS1, CS2, CS3 are needed. In order to obtain correct current information, a separate sensor signal processing circuit 11 is necessary that is able to generate the current sense signal $i_{SENSE}$ from the individual sensor signals provided by the current sensors CS1, CS2, CS3. It is self-evident that the extra processing of current sense signals increases the complexity of the overall circuit arrangement.

At this point it should be emphasized that a standard analog PFC controller circuit (such as, e.g., the 8-pin active PFC controller UCC28019 from Texas Instruments) only provides a single PWM signal as gate signal for the boost stage. As mentioned above, in dual-boost PFC converter topologies both transistors $Q_1$ and $Q_2$ may be driven by the same PWM signal generated by a standard analog PFC controller circuit. One consequence thereof is the split return current paths as discussed in detail above. Using a standard analog PFC controller circuit is strongly desired in many applications with the consequence that a rather complex current sensing is needed as described above with reference to FIG. 4. In the following an alternative approach is presented that allows operating a dual-boost PFC converter with a standard analog PFC controller circuit and without the need of a complex current sensing and sensor signal processing.

Figure 5:
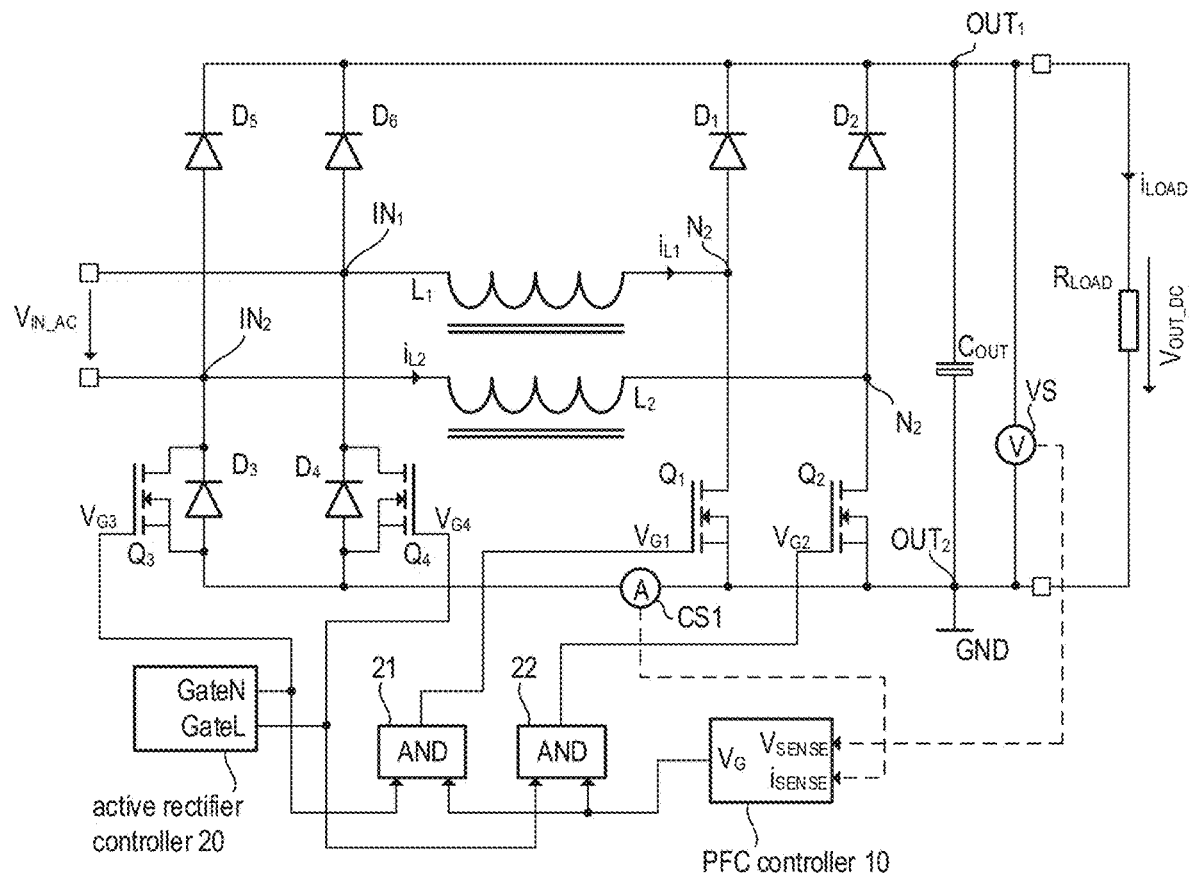
FIG. 5 illustrates one embodiment of a dual-boost PFC converter including control circuitry and one current sensor.

The embodiments described herein use the transistors $Q_3$ and $Q_4$ for active rectification to avoid losses in the rectifier diodes $D_3$ and $D_4$. Controller circuits for active rectifiers are as such known and thus not further discussed here. One example is illustrated in FIG. 5. The converter topology of FIG. 5 is basically the same as in the previous example. However, with the help of an "intelligent" combination of the output signals of the active rectifier controller 20 and the PFC controller 10, a single current sensor becomes sufficient. In the present example, the current sensor CS1 is placed in the return current path in series to the rectifier transistors $Q_3$ and $Q_4$ (transistor $Q_3$ is active only during the positive semi-wave and $Q_4$ is active only during the negative semi-wave of the AC input current). Thus, the current sensor senses the current returning to (and passing through) the rectifier stage (transistors $Q_3$ and $Q_4$) which is substantially equal to the inductor current $i_{L1}$ or $i_{L2}$ (in the positive or negative semi-wave). Distribution of the inductor currents $i_{L1}$ and $i_{L2}$ (during the positive and, respectively, negative semi-wave) among two separate return current paths is avoided (cf. FIG. 2) because the second return path (via $Q_2$ during the positive semi-wave and $Q_1$ during the negative semi-wave) is blocked by deactivation (switching into a non-conducting state) of the respective transistors $Q_2$ (during the positive semi-wave) and $Q_1$ (during the negative semi-wave).

The active rectifier controller 20 is configured to drive the transistor $Q_3$ into an active (conducting) state during the positive semi-wave of the AC input voltage $V_{IN\_AC}$ and into an inactive (non-conducting) state during the negative semi-wave. Conversely, the active rectifier controller 20 is configured to drive the transistor $Q_4$ into an active (conducting) state during the negative semi-wave of the AC input voltage $V_{IN\_AC}$ and into an inactive (non-conducting) state during the positive semi-wave. Accordingly, the outputs of the active rectifier controller 20 labelled "GateN" and "GateL" are connected to the gate electrodes of transistors $Q_3$ and $Q_4$, respectively. The respective gate signals are denoted as $V_{G3}$, and $V_{G4}$. As mentioned above, a simple PFC controller such as the controller circuit 10 generates only a single pulse-width-modulated drive signal $V_G$ (PWM gate signal). In the present example of FIG. 5, the PWM gate signal $V_G$ is combined with the gate signal $V_{G3}$ by AND-gate 21 to generate gate signal $V_{G1}$ for transistor $Q_1$. Similarly, the PWM gate signal $V_G$ is combined with the gate signal $V_{G4}$ by AND-gate 22 to generate gate signal $V_{G2}$ for transistor $Q_2$. The AND-combinations have the effect that the PWM signal $V_G$ is forwarded only to the gate of transistor $Q_1$ during the positive semi-wave of the AC input voltage $V_{IN\_AC}$ (while the gate signal of transistor $Q_2$ is blanked) and only to the gate of transistor $Q_2$ during the negative semi-wave of the AC input voltage $V_{IN\_AC}$ (while the gate signal of transistor $Q_1$ is blanked). Consequently, only the first return current path is available, namely the current path via transistor $Q_3$ during the positive semi-wave and via transistor $Q_4$ during the negative semi-wave of the AC input voltage $V_{IN\_AC}$. The second return current path (e.g. via transistor $Q_2$ during the positive semi-wave, cf. FIG. 2) is blocked.

Figure 6:
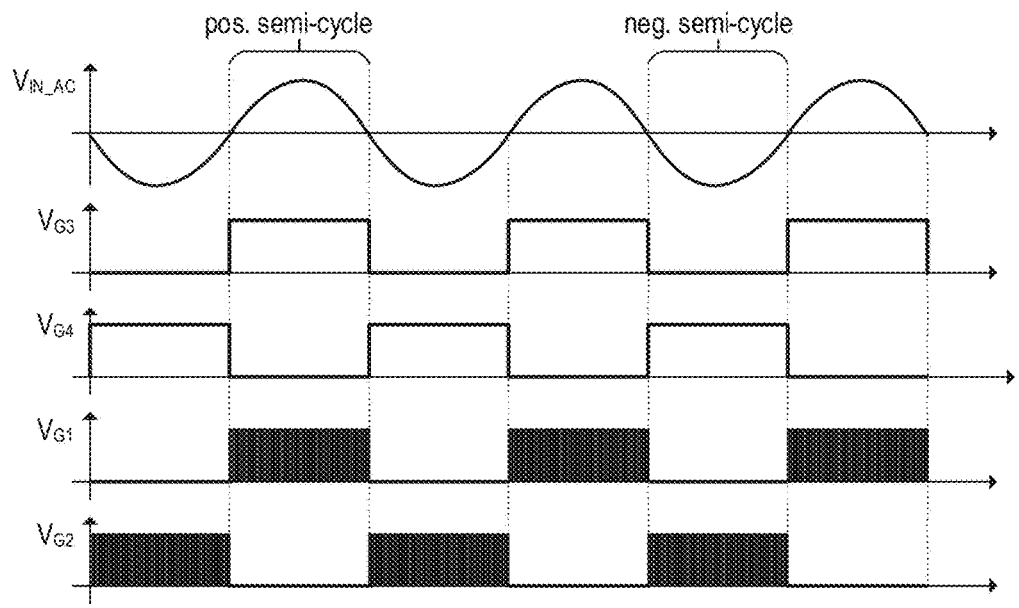
FIG. 6 includes timing diagrams showing exemplary waveforms of AC input voltage and the respective gate voltages of the transistors used for active rectification as well as the transistors used for power factor correction.

The function of the circuit of FIG. 5 is further illustrated in the timing diagrams of FIG. 6. The top diagram illustrates the AC input voltage $V_{IN\_AC}$. The waveform includes six semi-waves and each semi-wave has a duration, for example, of 10 ms, in the case of a 50 Hz grid voltage. The second and the third diagram of FIG. 6 illustrate the gate signals $V_{G3}$ and $V_{G4}$ of the active rectifier transistors $Q_3$ and, respectively, $Q_4$. As one can see, transistor $Q_3$ is conducting ($V_{G3}$ is at high level) and $Q_4$ is non-conducting during the positive semi-waves of the AC input voltage $V_{IN\_AC}$, whereas transistor $Q_4$ is conducting and $Q_3$ is non-conducting during the negative semi-waves.

As discussed above, due to the AND-combinations of the PWM signal $V_G$ and the gate signals $V_{G3}$ and $V_{G4}$, the gate signal $V_{G1}$ ($V_G$ AND $V_{G3}$) is pulse-width modulated during the positive semi-waves and zero (i.e. blanked, which means at a low level in the present example) during the negative semi-waves, thus blocking the second return current path in the negative semi-wave. Similarly, the gate signal $V_{G2}$ ($V_G$ AND $V_{G4}$) is pulse-width modulated during the negative semi-waves and blanked during the positive semi-waves, thus blocking the second return current path in the positive semi-wave. Basically the gate signal $V_{G3}$ and/or the gate signal $V_{G4}$ are used to distinguish the positive semi-wave from the negative semi-wave of the AC input voltage $V_{IN\_AC}$.

Figure 7:
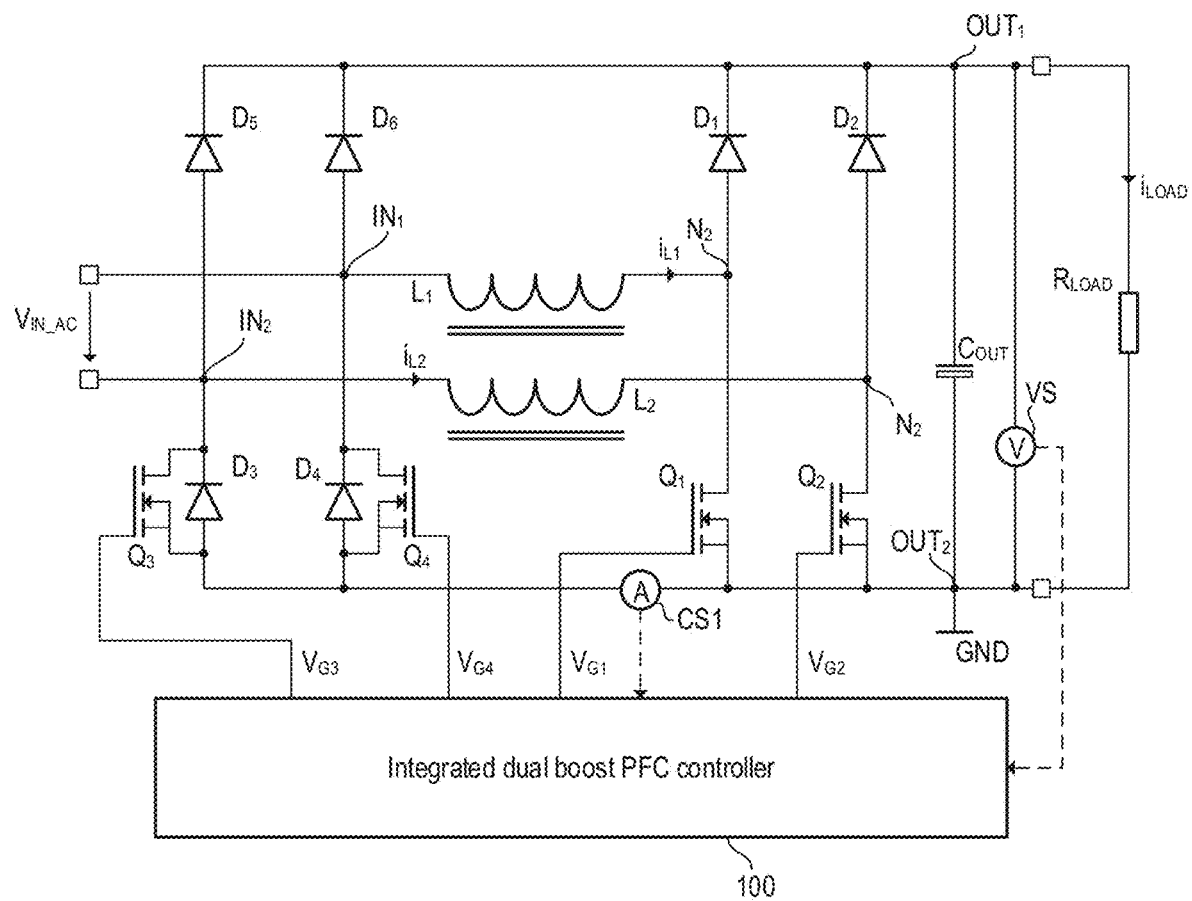
FIG. 7 illustrates an embodiment of a dual-boost PFC converter with a fully integrated PFC control circuit requiring only one current sensor.

The functionality required to generate the gate signals $V_{G1}$, $V_{G2}$, $V_{G3}$, and $V_{G4}$ shown in FIG. 6 can also be realized using a fully integrated dual-boost PFC controller 100. FIG. 7 illustrates such an integrated solution. The integrated dual-boost PFC controller 100 may include hard wired circuitry, as well as a processor configured to perform the functions necessary to generate the gate signals of the dual-boost PFC converter of FIG. 7, which is the same as in the example of FIG. 5. If the controller 100 includes a processor, the functions for generating the gate signals may be implemented by software instructions that are executed by the processor during operation of the SMPS. In this case, the controller includes non-volatile memory for storing the software instructions. Alternatively, hard-wired logic circuitry may be used instead of a processor.

Figure 8:
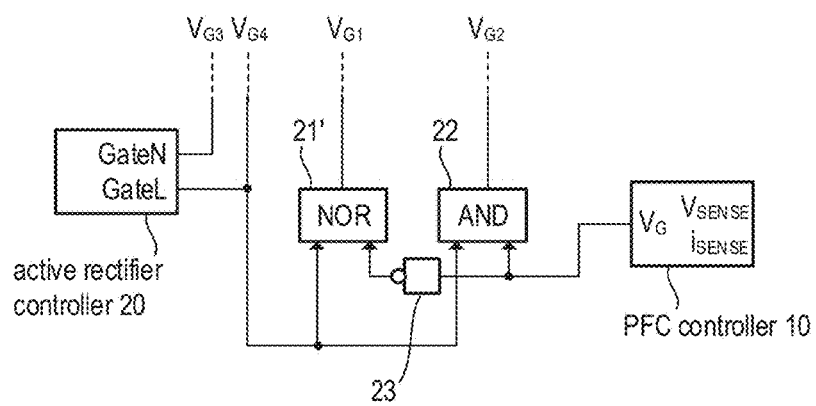
FIG. 8 illustrates an alternative to the example of FIG. 5.

It is noted that the logic circuit used for generating the control signals $V_{G1}$ and $V_{G2}$ for the boost stages (i.e. gate signals for transistors Q1 and $Q_2$) may be implemented in various different ways. One option is shown in FIG. 5, where AND-gates 21 and 22 are used to generate the control signals $V_{G1}$ and $V_{G2}$ based on the PWM control signal $V_G$ (provided by the PFC controller 10) and at least one of the control signals $V_{G3}$ and $V_{G4}$. FIG. 8 illustrates an exemplary alternative, in which the AND-gate 21 is replaced by a NOR-gate 21', which receives, as input signals, the signal $V_{G4}$ (which is basically the negation of signal $V_{G3}$) and the negation of signal $V_G$ (see inverter 23). It is understood that various other options for implementing the logic circuit exist which all substantially fulfill the same function.

Below some embodiments described above are summarized. It is noted, however, that the following is merely an exemplary summary and not an exhaustive enucleation of technical features. One embodiment relates to a circuit including a dual-boost PFC converter having an active rectifier stage with a first and a second rectifier transistor (see, e.g., FIG. 5, MOSFETs $Q_3$ and $Q_4$), a first boost stage with a first inductor and a first transistor (see, e.g., FIG. 5, inductor $L_1$ and MOSFETs $Q_1$), and a second boost stage with a second inductor and a second transistor (see, e.g., FIG. 5, inductor $L_2$ and MOSFETs $Q_2$). The circuit further includes an active rectifier controller circuit configured to generate a first and a second control signal for driving the first and, respectively, the second rectifier transistor on and off in accordance with an AC input voltage (see, e.g., FIG. 5, controller circuit 20, control signals $V_{G3}$ and $V_{G4}$). Further, the circuit includes a PFC controller circuit configured to generate a PWM control signal (see, e.g., FIG. 5, PWM signal $V_G$ provided by PFC controller 10) that is based on an output voltage of the first and the second boost stage (see, e.g. FIG. 5, common output voltage $V_{OUT\_DC}$) and which is further based on a current sense signal representing the current passing through the active rectifier stage (see, e.g. FIG. 5, single current sensor CS1). A logic circuit is configured to generate a third control signal for the first transistor of the first boost stage and a fourth control signal for the second transistor of the second boost stage based on the PWM control signal and at least one of the first and the second control signals (see, e.g. FIG. 5, logic gate circuits 21 and 22 providing signals $V_{G1}$ and $V_{G2}$ based on PWN signal $V_G$ and rectifier controller output).

In one embodiment, the active rectifier controller circuit may be configured to generate the first and the second control signal (cf. FIG. 5, signals $V_{G3}$, $V_{G4}$) such that the first rectifier transistor (cf. FIG. 5, MOSFET $Q_3$) is conducting during a positive semi-wave and the second rectifier transistor (cf. FIG. 5, MOSFET $Q_4$) is conducting during a negative semi-wave of the AC input voltage supplied to the rectifier stage. Additionally, the mentioned logic circuit may be configured to generate the third control signal (cf. FIG. 5, gate signal $V_{G1}$) and the fourth control signal (cf. FIG. 5, gate signal $V_{G2}$) from the PWM control signal such that the third control signal corresponds to the PWM control signal during positive semi-wave and is blanked during the negative semi-wave of the AC input voltage, whereas, conversely, the fourth control signal corresponds to the PWM control signal during negative semi-wave and is blanked during the positive semi-wave of the AC input voltage. The first and/or the second control signal(s) are used by the mentioned logic circuit (cf. FIG. 5, logic gate circuits 21 and 22) to distinguish the positive semi-wave from the negative semi-wave of the AC input voltage.

In one specific embodiment the first gate circuit may be configured to generate the third control signal by combining the PWM control signal and the first control signal (e.g. FIG. 5, AND-gate 21 combines signals $V_G$ and $V_{G3}$). Similarly, the second gate circuit may be configured to generate the fourth control signal by combining the PWM control signal (and the second control signal (e.g. FIG. 5, AND-gate 22 combines signals $V_G$ and $V_{G4}$). It is understood, that the same or a similar result may be obtained by many different logic circuit implementations.

Figure 9:
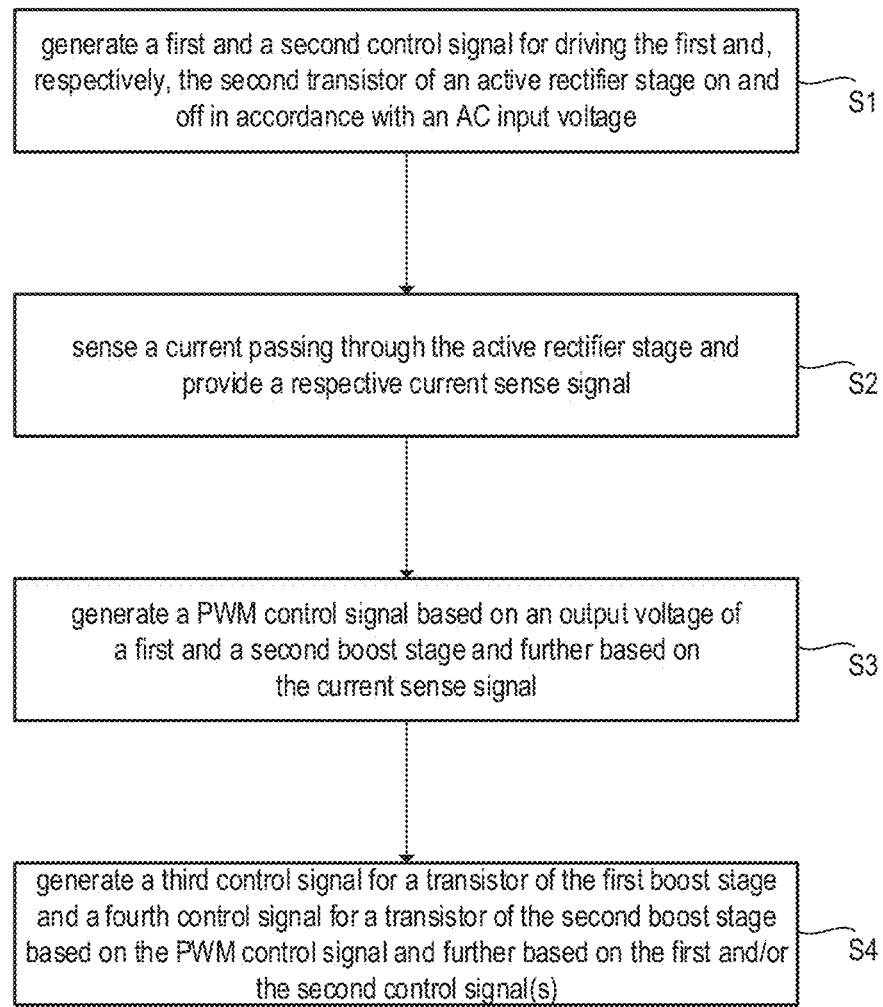
FIG. 9 includes a flow chart illustrating one exemplary method for controlling the operation of a dual-boost PFC converter.

A further embodiment, which is illustrated by the flow chart of FIG. 9 relates to a method that may be used to operate a dual-boost PFC converter. Such a dual-boost PFC converter has an active rectifier stage with a first and a second rectifier transistor, a first boost stage with a first inductor and a first transistor, and a second boost stage with a second inductor and a second transistor (see, e.g., FIGS. 5, 7 and 8). The method includes generating a first and a second control signal for driving the first and, respectively, the second rectifier transistor on and off in accordance with an AC input voltage (see FIG. 9, step S1); sensing a current passing through the active rectifier stage and providing a respective current sense signal (see FIG. 9, step S2); generating a PWM control signal based on an output voltage of the first and the second boost stage and further based on the current sense signal (see FIG. 9, step S3); and generating a third control signal for the first transistor of the first boost stage as well as a fourth control signal for the second transistor of the second boost stage based on the PWM control signal and at least one of the first and the second control signals (see FIG. 9, step S4).

In one embodiment generating the PWM control signal may be performed by a PFC controller circuit (see, e.g. FIG. 5, PFC controller 10). Additionally, generating the first and the second control signal may be performed by an active rectifier control circuit (see, e.g. FIG. 5, active rectifier controller 20). Moreover, in one embodiment, generating the third and the fourth control signals includes directing the PWM control signal to the transistor of the first boost stage during a positive semi-wave of the AC input voltage, and directing the PWM control signal to the transistor of the second boost stage during a negative semi-wave of the AC input voltage. The mentioned step of "directing" may be accomplished by the logic circuit mentioned above, e.g. by the AND-gates 21, 22 illustrated in FIG. 5. It is understood that an equivalent function may be implemented in various different ways including hard-wired logic as well as programmable circuits or processors executing appropriate software/firmware.

Although the invention has been illustrated and described with respect to one or more implementations, alterations and/or modifications may be made to the illustrated examples without departing from the spirit and scope of the appended claims. For example, in some applications, the logic levels may be inverted and different types of logic gates and complementary transistor types may be used. In particular with regard to the various functions performed by the above described components or structures (units, assemblies, devices, circuits, systems, etc.), the terms (including a reference to a "means") used to describe such components are intended to correspond—unless otherwise indicated—to any component or structure which performs the specified function of the described component (e.g., that is functionally equivalent), even though not structurally equivalent to the disclosed structure which performs the function in the herein illustrated exemplary implementations of the invention.

What is claimed is:

1. A circuit, comprising:
   a dual-boost power-factor correction (PFC) converter including an active rectifier stage with a first rectifier transistor and a second rectifier transistor, a first boost stage with a first inductor and a first transistor, and a second boost stage with a second inductor and a second transistor;

an active rectifier controller circuit configured to generate a first control signal and a second control signal for driving the first rectifier transistor and the second rectifier transistor, respectively, on and off in accordance with an AC input voltage;

a PFC controller circuit configured to generate a pulse-width-modulated (PWM) control signal based on an output voltage of the first and the second boost stages and further based on a current sense signal representing the current passing through the active rectifier stage; and a logic circuit configured to generate a third control signal for the first transistor of the first boost stage and a fourth control signal for the second transistor of the second boost stage, based on the PWM control signal and at least one of the first and the second control signals.

2. The circuit of claim 1, wherein the active rectifier controller circuit is configured to generate the first and the second control signals such that the first rectifier transistor is conducting during a positive semi-wave and the second rectifier transistor is conducting during a negative semi-wave of the AC input voltage.

3. The circuit of claim 2, wherein the logic circuit is configured to generate the third control signal and the fourth control signal from the PWM control signal such that:

the third control signal corresponds to the PWM control signal during the positive semi-wave and is blanked during the negative semi-wave of the AC input voltage; and the fourth control signal corresponds to the PWM control signal during the negative semi-wave and is blanked during the positive semi-wave of the AC input voltage.

4. The circuit of claim 3, wherein at least one of the first and the second control signals are used by the logic circuit to distinguish the positive semi-wave from the negative semi-wave of the AC input voltage.

5. The circuit of claim 1, wherein the logic circuit comprises:

a first gate circuit configured to generate the third control signal by combining the PWM control signal and the first control signal; and a second gate circuit configured to generate the fourth control signal by combining the PWM control signal and the second control signal.

6. The circuit of claim 5, wherein the first gate circuit is an AND gate, and wherein the second gate circuit is an AND gate.

7. A method for operating a dual-boost power-factor correction (PFC) converter, which includes an active rectifier stage with a first rectifier transistor and a second rectifier transistor, a first boost stage with a first inductor and a first transistor, and a second boost stage with a second inductor and a second transistor, the method comprising:

generating a first control signal and a second control signal for driving the first rectifier transistor and the second rectifier transistor, respectively, on and off in accordance with an AC input voltage;

sensing a current passing through the active rectifier stage and providing a respective current sense signal;

generating a pulse-width-modulated (PWM) control signal based on an output voltage of the first and the second boost stages and further based on the current sense signal; and generating a third control signal for the first transistor of the first boost stage and a fourth control signal for the second transistor of the second boost stage, based on the PWM control signal and at least one of the first and the second control signals.

8. The method of claim 7, wherein generating the PWM control signal is performed by a PFC controller circuit.

9. The method of claim 7, wherein generating the first and the second control signals is performed by an active rectifier control circuit.

10. The method of claim 7, wherein generating the third and the fourth control signals comprises:

directing the PWM control signal to the first transistor of the first boost stage during a positive semi-wave of the AC input voltage; and directing the PWM control signal to the second transistor of the second boost stage during a negative semi-wave of the AC input voltage.

\* \* \* \* \*